Aug. 17, 1965   E. H. FREDRICKSON   3,201,533
ROTARY TYPE CONTROL SWITCH
Filed June 28, 1961   5 Sheets-Sheet 1

INVENTOR.
EINAR H. FREDRICKSON
BY
OSTROLENK, FABER, GERB & SOFFEN
ATTORNEYS

Aug. 17, 1965  E. H. FREDRICKSON  3,201,533
ROTARY TYPE CONTROL SWITCH
Filed June 28, 1961  5 Sheets-Sheet 2

INVENTOR.
EINAR H. FREDRICKSON
BY
OSTROLENK, FABER, GERB & SOFFEN

ATTORNEYS

Aug. 17, 1965                E. H. FREDRICKSON                3,201,533
                          ROTARY TYPE CONTROL SWITCH
Filed June 28, 1961                                        5 Sheets-Sheet 3
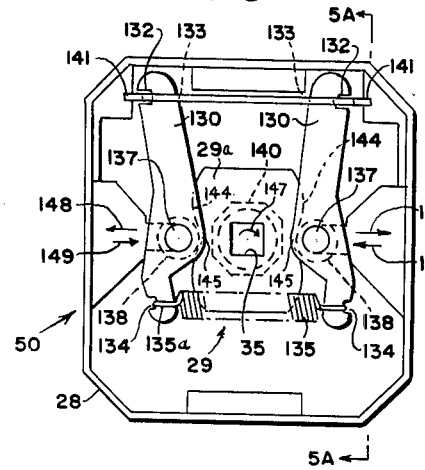
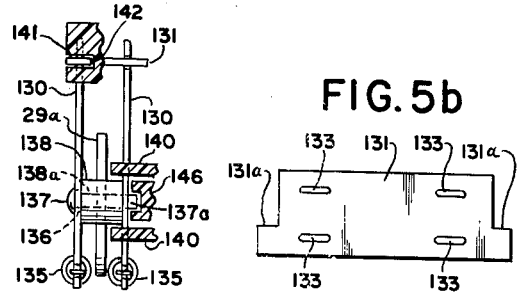
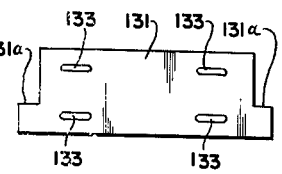
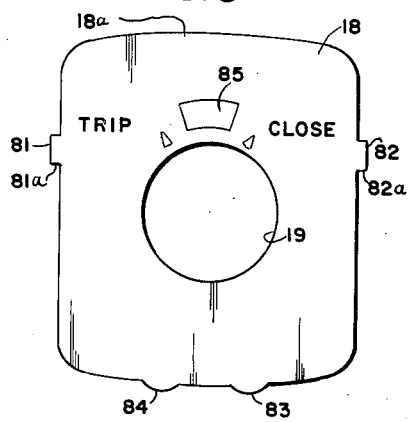
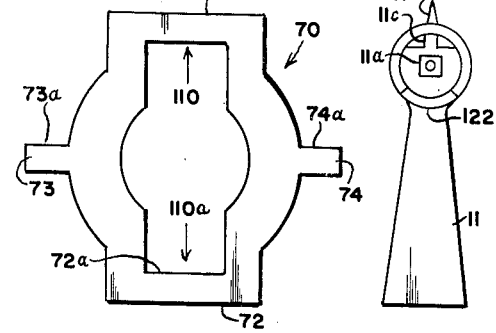
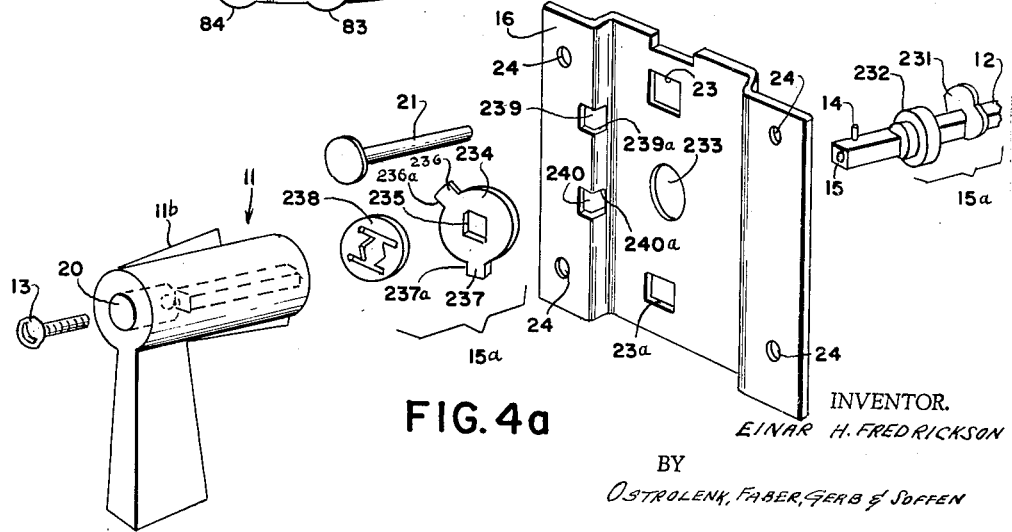
INVENTOR.
EINAR H. FREDRICKSON
BY
OSTROLENK, FABER, GERB & SOFFEN
ATTORNEYS Aug. 17, 1965  E. H. FREDRICKSON  3,201,533
ROTARY TYPE CONTROL SWITCH
Filed June 28, 1961  5 Sheets-Sheet 4
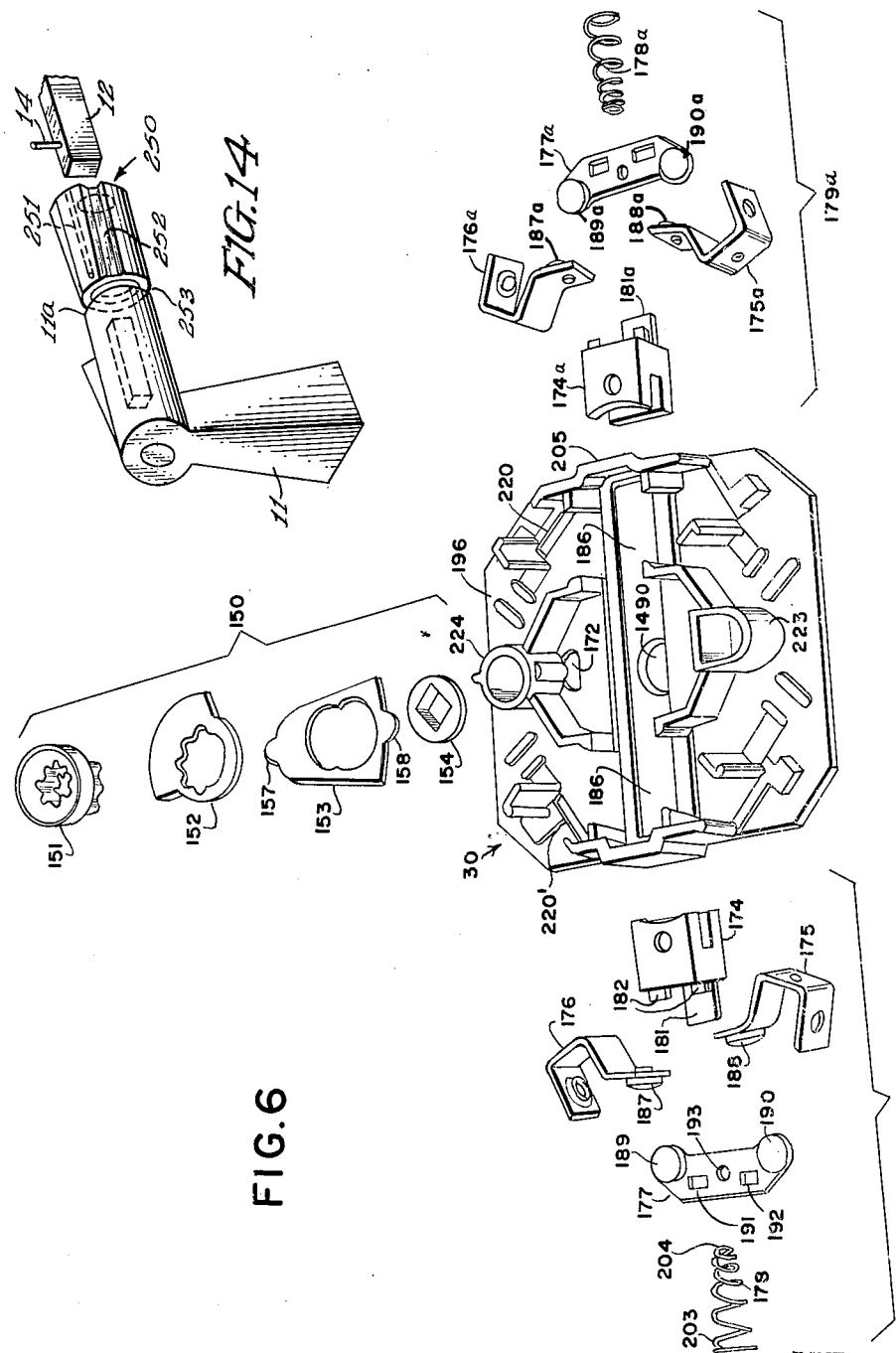
INVENTOR.
EINAR H. FREDRICKSON
BY
OSTROLENK, FABER, GERB & SOFFEN
ATTORNEYS

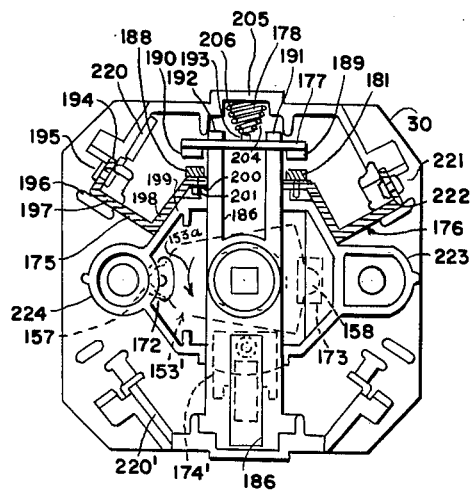
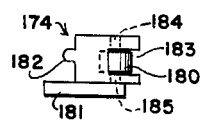
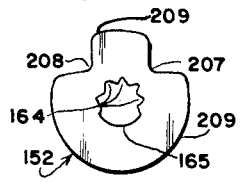
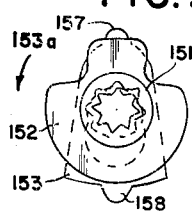
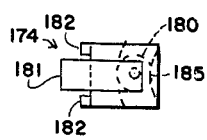
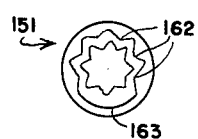
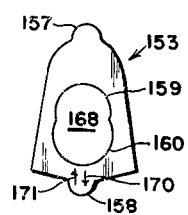
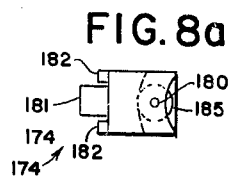
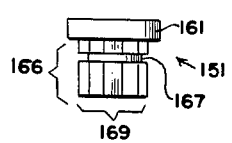

3,201,533
ROTARY TYPE CONTROL SWITCH
Einar H. Fredrickson, Ambler, Pa., assignor to I-T-E Circuit Breaker Company, Philadelphia, Pa., a corporation of Pennsylvania
Filed June 28, 1961, Ser. No. 122,058
12 Claims. (Cl. 200—16)

My invention relates to switches and more particularly to rotary type switches having a plurality of contact stages under the control of a single operating handle in which the switch elements are properly positioned without the need for fastening means.

In the operation of complex electronic circuitry, it is usually desirable and quite often necessary to energize and/or de-energize a plurality of circuits so that all of the required contact makes or breaks occur in a predetermined sequence. One advantageous manner in which such an operation is performed is to gang a plurality of contact stages such that each stage is placed under the control of one operating handle. That is, the operating handle makes and/or breaks the contact pairs of each contact stage in a predetermined sequence.

One example of this type of operation is in the circuit breaker field. It is desirable to have an electrically operated opening and closing circuit for the circuit breaker contacts which circuit is energized under the control of a manually-actuated operating handle. In addition to the tripping (or closing) operation, a number of auxiliary functions must be performed simultaneously therewith. For example, flashing red and green lights which denote the condition of the circuit breaker may be required at a remote control station. Also, additional protective equipment may require energization or de-energization due to its relationship with the operation of the circuit breaker being tripped (or closed).

Switches presently in use have been designed to have a plurality of contact stages which are ganged to a main shaft which simultaneously controls the movement of the contacts of each contact stage.

Quite often the equipment under control of one particular pair of contacts in a contact stage requires a relatively large magnitude of current for its operation. The making and breaking of contact pairs carrying such large magnitude currents creates a large amount of oxidation on the surface of each contact of the contact pair, due to an arc which forms during the make and the break operation. The oxidation which takes place on the surface of each contact substantially increases the resistivity between the contact pair when the contacts are in engagement, causing the current flowing therethrough to be considerably diminshed. This added resistivity also causes an undue amount of heating to take place between the contacts which further contributes to the losses occurring in the contact control circuit.

All of the components which make up each contact stage must be adequately positioned and secured within its respective encasement in order to insure satisfactory operation. This function is generally performed by a variety of fastening means such as nuts, bolts, rivets, screws and so forth. The fastening means, of necessity, contribute to the number of components required in each stage of the switch assembly, thereby increasing the complexity and fabrication time of each contact stage of the switch assembly.

The gang switch of my invention has a novel design which permits all the components of each contact stage to be properly positioned and secured within the switch assembly without any fastening means whatsoever. This permits each contact stage to be formed only of necessary components thereby substantially decreasing the cost, complexity and fabrication time of a multi-stage switch. In addition, each contact stage is further designed to cause a contact wiping action every time a contact pair is brought into engagement. The wiping action removes the existing oxidation from the contact surfaces, thereby assuring a larger metal-to-metal contact engagement having an extremely low resistivity between the contact surfaces.

My novel multi-contact switch consists of a plurality of contact stages in an axial alignment having a main shaft positioned through the central axis of each contact stage. The rotation of the main shaft about its longitudinal axis controls the making and/or breaking of all the contact pairs of the ganged switch assembly. An operating handle is keyed to the front end of the main shaft to provide for easy manual rotation of the shaft.

A molded escutcheon stage mounted adjacent the operating handle contains a self-retaining flag indicator and cooperating name-plate means which apprises the user of the last operation performed by the switch. The escutcheon assembly also includes novel mounting means for securing the escutcheon to the front of a compartment or to the panel of a control board.

A detent stage is mounted immediately behind the molded escutcheon assembly, for automatically returning the operating handle and main shaft to the neutral position immediately after the manual operation of the operating handle is completed. The detent stage also provides for other detent wheels which position the handle and main shaft at various angular positions. Spring means serving as the moving force for the detent stage also serves the function of positioning and securing all of the components of the detent stage thereby avoiding the need for any fastening means. The molded case housing the detent stage is designed so as to provide for unimpeded operation of the detent mechanism while, at the same time, preventing any unnecessary movement of the detent mechanism.

The desired number of contact stages are ganged to the main shaft immediately behind the detent stage. The number of contact stages which are ganged to one operating handle is dependent upon the length of the main shaft and upon the operating torque limitations imposed by the contact stages on the operating handle. For example, if a large number of contact stages is required the shaft length may be chosen accordingly.

Each contact stage consists of two double-break contact sets which are side mounted on opposite sides of an aperture in the contact stage housing through which the main shaft passes. A centrally mounted cam which is driven by the main shaft, moves the contact pairs between engagement and disengagement. Each contact stage has the self-retaining feature mentioned above thereby avoiding the need for any type of fastening means. The movable contact of each double-break contact set is so arranged as to provide a concurrent rolling and wiping action when the contacts of the contact set are brought into engagement to prevent the cocurrence of oxidation on the surface of each contact. The double break contact pairs act as a rapid arc extinguishing means.

The cams which control the movement of each contact stage may have a variety of different shapes depending only upon the operation which any particular stage is to perform.

A specially designed operating handle for the auxiliary switch assembly permits the handle to be removed safely without danger of an incorrect handle being inserted into the auxiliary switch assembly. The indicating stage is so arranged that a plurality of different positions may be chosen each requiring a keyed handle which is unique from the other handles.

The self retaining feature of the switch assembly further permits the removal of any contact stage for inspection or repair without any danger of the components of the removed stage being accidentally disengaged from the molded case of that stage.

It is, therefore, one object of my invention to provide a switch assembly having a plurality of novel double-break contact pairs having self-retaining features.

Another object of my invention is to provide a novel switch assembly having a plurality of contact stages which are simultaneously controlled by a single, manually operable main shaft which are so arranged as to operate in a variety of different ways.

Another object of my invention is to provide a position indication means for a switch assembly having a novel arrangement for indicating the last operation performed by the switch assembly.

Another object of my invention is to provide a switch assembly having an escutcheon stage, a detent stage and a plurality of contact stages which are so arranged as to avoid the need for fastening means in order to position and secure the operating elements of each stage.

Another object of my invention is to provide a switch assembly having a plurality of contact stages wherein each contact stage consists of a plurality of double-break contact sets.

Another object of my invention is to provide a switch assembly having a plurality of contact stages, wherein the contact sets of each stage perform a rolling and wiping function during the engagement of each contact set.

Still another object of my invention is to provide a switch assembly having a plurality of contact stages wherein the contact sets of each stage are cam operated.

Another object of my invention is to provide a cam operated switch assembly having a plurality of contact stages wherein the cam of each stage assumes a variety of different configurations for the control of the contact sets.

Another object of my invention is to provide an auxiliary switch assembly having a removable operating handle wherein novel keying means are provided to prevent the insertion of all incorrectly keyed handles into the switch assembly.

These and other objects of my invention will become apparent from the following description when taken in connection with the drawings, in which:

FIGURE 3 is a front view of the cooperating escutcheon name-plate shown in FIGURE 1.

FIGURE 4 is a front view of the flag indicator holding means employed in the molded escutcheon of FIGURES 1 and 2.

FIGURE 4a is an exploded view of the panel mounting elements of FIGURE 1.

FIGURE 4b is a rear view of the operating handle of FIGURE 1.

FIGURE 5 is a front view of the detent mechanism shown in FIGURE 1.

FIGURE 5a is an end view of the detent mechanism of FIGURE 5 taken along the line 5A—5A.

FIGURE 5b is a top view of one member of the detent stage of FIGURE 5.

FIGURE 5c is a side view of a modification of the detent mechanism shown in FIGURE 5.

FIGURE 6 is an exploded perspective view of the contact stage shown in FIGURE 1.

FIGURE 7 is a top view of the contact housing shown in FIGURE 6 showing the mounting of some of the contact elements of FIGURE 6.

FIGURES 8a, 8b and 8c are top, bottom and side views respectively of the movable contact carrier of FIGURE 6.

FIGURE 9 is a top view showing the assembly of the elements which make up the cam subcombination of FIGURE 6.

FIGURE 11 is a top view of the cam member shown in FIGURE 9.

FIGURES 12a and 12b are bottom and side views, respectively, of the cam hub of FIGURE 9.

FIGURE 13 is a top view of the cam retainer of FIGURE 9.

FIGURE 14 is a perspective view of another embodiment of the operating handle of FIGURE 1.

Figure 1:
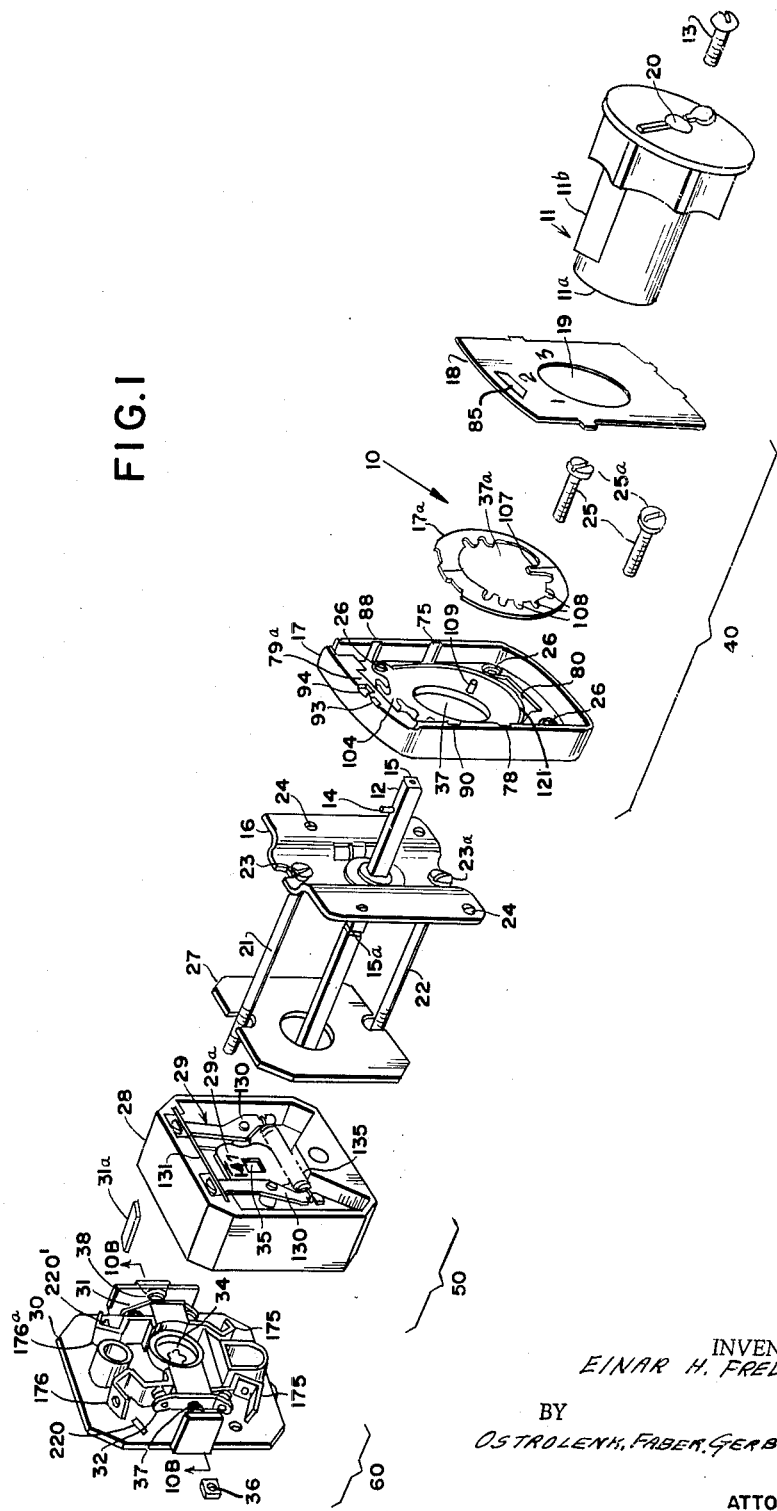
FIGURE 1 is a perspective view of my novel switch assembly wherein the stages of the switch assembly are shown in an exploded manner.

Referring now to the drawings, FIGURE 1 shows my novel switch assembly 10 which consists of an operating handle 11 secured to shaft 12 which has a rectangular cross-section. The shaft 12 is mounted in a rectangular opening (not shown) of operating handle 11 and is rigidly secured to operating handle 11 by a screw 13 which is inserted in the aperture 20 of operating handle 11 and which is mounted to engage a tapped hole 15 in shaft 12. Projection 14 on shaft 12 cooperates with a key-hole shaped aperture (not shown) in the end 11a of operating handle 11 in order to axially position shaft 12 to operating handle 11 for a purpose to be more fully described.

The escutcheon molding 17, indicator plate 17a, and front or name-plate 18 are positioned immediately adjacent operating handle 11, so that the end 11a of operating handle 11 passes through apertures 37, 37a and 19 of the molding 17, indicator plate 17a and name-plate 18 respectively. The name plate 18 has a configuration which cooperates with the configuration of molded case 17, so that name-plate 18 is secured to escutcheon molding 17 without need for fastening means in a manner to be more fully described.

The switch assembly may be mounted to any type of a support by sandwiching the panel of the support (not shown) between the escutcheon molding 17 and mounting plate 16. Mounting plate 16 and escutcheon molding 17 are mounted to the panel member (not shown) by means of apertures 24 and 26 respectively through which are inserted screw means 25. It is, of course, obvious that apertures must be provided in the panel means which apertures are in alignment with the apertures 24 and 26 of mounting plate 16 and escutcheon molding 17 respectively. Apertures 24 of mounting plate 16 are tapped to engage the threads of screws 25 enabling the switch assembly to be rigidly mounted to the panel member.

Main shaft 12 is longitudinally positioned by restraining means 15a in order to prevent any lengthwise movement of the main shaft. Bolts 21 and 22 which are inserted through apertures 23 and 23a respectively are positioned to be inserted through associated apertures (not shown) in detent stage 50 and contact stage 60 respectively. Bolts 21 and 22 are threaded to engage nuts such as, for example, nut 36 in order to rigidly fasten the stages to form a rigid switch assembly.

Detent stage 50 consists of a molded case 28 which is designed to house the detent mechanism 29 in such a manner as to prevent any movement of the detent mechanism other than the necessary pivotal movement of rotating member 29a which is urged into rotation by main shaft 12 which is inserted through aperture 35 in rotating member 29a. Cover member 27 is provided to encase the detent mechanism 29 in housing 28 so that it is adequately protected from any dust or dirt in the surrounding atmosphere. It should be understood that the rear (not shown) of molded case 28 has an aperture therethrough to provide for the passage of main shaft 12.

Contact stage 60 consists of contact sets 31 and 32 which are cam driven out of engagement under control of main shaft 12. Biasing means 37 and 38 act against the cam drive assembly 30 of the contact stage 60 to urge the contact sets towards engagement. Aperture 34 in contact stage 60 is provided for the insertion of main shaft 12. The configuration of the cam assembly 30 is such that any rotation of main shaft 12 is imparted to the cam assembly 30 of the contact stage 60. All the elements which make up contact stage 60 have the self-retaining features described above, thereby avoiding the need for any fastening means. Although only one contact stage is shown in FIGURE 1, it should be understood that many more contact stages may be added simply by employing a longer main shaft 12 and longer fastening bolts 21 and 22. The self-retaining features of the contact stage 60 are such that removal of the contact stage 60 from the switch assembly 10 for inspection or maintenance purposes will not cause disengagement of any of the elements. However, if it is desired to remove any of the elements of contact stage 60, very little force is required for their removal, and likewise for their replacement. The movement of the movable contacts of each contact set 31 and 32 provides a novel rolling and wiping action during contact engagement, as will be more fully described.

Figure 2:
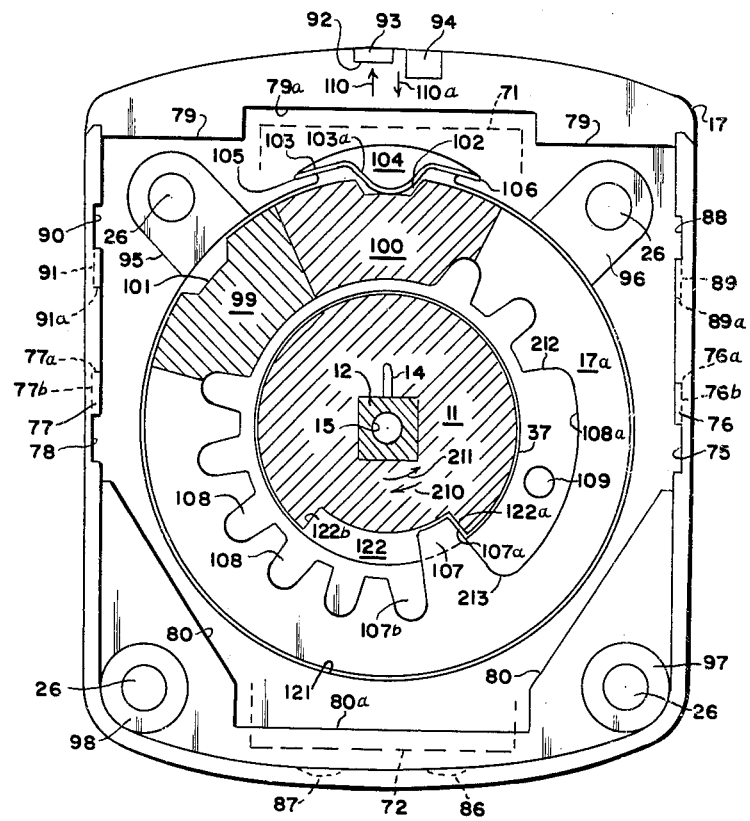
FIGURE 2 is a front view of the molded escutcheon shown in FIGURE 1.

FIGURES 2, 3 and 4 show the elements of the escutcheon assembly 40 shown in FIGURE 1 which consists of molded case 17, flag indicating member 17a, retaining member 70 and front plate 18.

Molded case 17 has a circular recess 121 in which indicating member 17a is seated. A second recess is provided in molded escutcheon case 17 which is bounded at the top by edges 79 and 79a and at the bottom by edges 80 and 80a. The distance between edges 79a and 80a is just slightly greater than the distance between edges 71 and 72 of holding plate 70 as shown in FIGURE 4. It can, therefore, be seen that this second recess having upper 79a and lower 80a edges serves to secure the locking member 70 in order to prevent any vertical movement of the locking member. The holding feature is provided by the projections 73 and 74 in locking member 70, and by the cooperating notches 75 and 78 and grooves 76 and 77 in molded case 17. The seating of locking member 70 in the appropriate position in molded case 17 is performed as follows: Locking member 70 is positioned on molded case 17 so that projection 74 of locking member 70 cooperates with notch 75 of molded case 17, and projection 73 cooperates with slot 78 of molded case 17. In this position, lower edge 72 of locking member 70 rests upon the ledge bordered by the edge 80a, as shown by dotted line 72 in FIGURE 2, and upper edge 71 of locking member 70 is positioned below the recess bounded by edge 79a of case 17. Locking member 70 is then pushed upward in the direction shown by arrow 110 so that projection 74 slides into the groove 76 and so that projection 73 slides into the groove 77. At the instant that edge 74a of projection 74 abuts against the edge 76a of groove 76, and the edge 73a of projection 73 abuts against the edge 77a of groove 77, the lower edge 72 of locking member 70 slips over the edge 80a and the upper edge 71 of locking member 70 abuts against the edge 79a of molded case 17. The locking member is now restrained from any vertical movement due to the edges 79a and 80a of molded case 17 and is restrained from any horizontal movement due to the edges 76b and 77b of grooves 76 and 77 respectively. The sides (not shown) of the grooves 76 and 77 prevent any movement in a direction which is perpendicular to the plane of FIGURE 2. It can therefore be seen that once locking member 70 is properly seated, it is restrained from movement in any direction without the use of rivets, screws, or any other like type of fastening means. In addition to avoiding the need for separate fastening means, the operation of positioning and securing locking member 70 in molded case 17 is greatly simplified.

When properly seated in molded case 17, the locking member 70 serves to retain flag indicator member 17a in molded case 17 thereby preventing flag indicator member 17a from exhibiting any movement other than the required rotational movement about the axis of main shaft 12, as will be more fully described.

The removal operation of locking member 70 is as follows: The lower edge 72a of locking member 70 is lifted slightly so that the bottom surface of locking member 70 is slightly higher than the edge 80a of molded case 17. When the lower edge 72a of locking member 70 is in this position, the locking member 70 is then moved downward in the direction shown by arrow 110a until projections 73 and 74 of locking member 70 are completely removed from grooves 77 and 76 respectively. At this instant, locking member 70 may be moved upward in a direction normal to the plane of FIGURE 2, since the notches 75 and 78 do not restrain projections 74 and 73 respectively from being moved vertically upward from the plane of FIGURE 2. It can, therefore, be seen that the removal operation of locking member 70 can be performed as simply as the seating operation.

Name plate 18 shown in FIGURES 1 and 3 is mounted to molded case 17 in the same manner as locking member 70. Projection 82 on name-plate 18 is aligned to cooperate with notch 88 in molded case 17, and projection 81 on name-plate 18 is aligned to cooperate with notch 90 in molded case 17. In this position, rounded projections 83 and 84 of main plate 18 are slightly above the rounded grooves 86 and 87 respectively of molded case 17, and top edge 18a of main plate 18 is resting upon molded projection 93 of molded case 17.

Main plate 18 is then moved downward in the direction shown by arrow 110a so that projection 82 of name-plate 18 enters groove 89, and projection 81 enters groove 91. At the instant that edge 82a of projection 82 abuts against edge 89a of groove 89 and edge 81a of projection 81 abuts against edge 91a of groove 91, projections 83 and 84 enter into the curved grooves 86 and 87 respectively of molded case 17, and top edge 18a of name-plate 18 abuts against the lower edge 92 of molded projection 93. In this position name-plate 18 is retrained from movement in any direction in the same manner as locking member 70 described above.

Removal of main plate 18 from molded case 17 is performed by inserting a pointed instrument such as a screwdriver (not shown) between main plate 18 and molded case 17 in the bevelled groove 94 provided on molded case 17. Insertion of the pointed instrument causes name-plate 18 to bend slightly to the point where name-plate 18 lies slightly above the top of molded projection 93. In this position, name-plate 18 is now moved upward in the direction shown by arrow 110, since name-plate 18 is no longer restrained by the edge 92 of molded projection 93. When projections 81 and 82 are removed from grooves 91 and 89 respectively, of molded case 17, name-plate 18 may be lifted upward in a direction normal to the plane of FIGURE 2. Thus, it can be seen that name-plate 18 can be positioned and secured without the need of fastening means in the same manner as locking member 70 described above. Locking member 70 and name-plate 18 are designed so that they can be positioned only in the slots provided for them in molded case 17.

The apertures 26 in molded case 17 which are provided for screws 25 (see FIGURE 1) for the purpose of securing mounting plate 16 to molded case 17 are recessed, as shown at 95, 96, 97 and 98 in FIGURE 2, so that the top surfaces 25a of screws 25 do not interfere with the mounting of name-plate 18.

Flag indicator member 17a which is seated in the recess bounded by circular edge 121 is provided with notches 101 and 102 along its outer periphery. The inner periphery of flag indicator member 17a is provided with a plurality of notches 108, an elongated notch 108a, and an index finger 107. The notches 101 and 102 cooperate with a spring 103 which is mounted in recess 104 of molded case 17. The opposite ends of spring 103 abut against the sharp corners 105 and 106 of recess 104. The central arcuate portion 103a of spring 103 is arranged to cooperate with the notches 101 and 102 of indicator flag member 17a to restrain undesirable movement of flag member 17a in a manner to be more fully described. The notches 108 and 108a of indicator member 17a are positioned with respect to molded projection 109 of molded case 17 to limit the rotation of flag member 17a for a reason to be more fully described. The index finger 107 of indicator member 17a is arranged to cooperate with notch 122 of operating handle 11 to form a lost-motion linkage, which operates in a manner to be more fully described.

FIGURES 1, 5, 5a and 5b show the detent stage 50 which consists of a molded case 28 and a detent mechanism 29. The detent mechanism 29 comprises a plate 131 (note especially FIGURE 5b) having a plurality of apertures 133. An arm 130 is inserted through each aperture 133 so that each notch 132 in arm 130 bounds the upper and lower surfaces of plate 131. The lower ends of each arm 130 have a notch 134 around which a terminal loop 135a of spring 135 is positioned such that a pair of arms 130 such as is shown in FIGURE 5, is drawn together by spring 135. Each arm 130 has an aperture 136 located approximately half-way up from the bottom of the arm for the purpose of engaging a pin 137 having a rounded head. A plastic roller 138 having an aperture 138a therethrough for inserting rod 137 is positioned between a pair of arms 130 as shown in FIGURE 5a. A cam member 29a having oppositely disposed notches 145 positioned between arcuate edges 144 is positioned between arms 130 so that notches 145 abut the inward edges of cylinders 138. The dimensions of cam 29a is such that springs 135 must be forced towards a slightly extended position in order to properly position cam 29a between cylinders 138. This design provides the self-retaining feature of the detent mechanism 29 such that the forces exerted by springs 135 against arms 130 provide forces adequate to hold all of the elements of the detent mechanism together without the need of any fastening means. It should be noted that pins 137 need not be threaded nor need they be fastened at their ends 137a, since the sidewise force components due to springs 135 provide the necessary holding forces to hold the assembly together.

Slots 141 in molded case 28 are arranged to position plate 131. Ledges 142 in slots 141 abut against edges 131a of plate 131 (see FIGURE 5b). A cylindrically shaped molded projection 140 shown in FIGURES 5 and 5a serves as the means upon which cam 29a may rest while molded projections 146 serve as guides for arms 130. When detent mechanism 29 is seated in molded case 28, and cover 27 (see FIGURE 1) is assembled to the molded case 28, the arms 130 are prevented from moving out of the molded case 28 by means of the rounded head of pin 137 which guides against the inside surface of cover 27.

The rectangularly shaped aperture 35 in cam 29a is engaged by main shaft 12 (see FIGURE 1) such that any rotation of main shaft 12 is imparted to cam member 29a.

The operation of detent mechanism 29 is as follows: Cam 29a is rotated clockwise as shown by arrow 147 under control of main shaft 12. Diagonally opposite arcuate edges 144 of cam 29a are driven against rollers 138, causing the arms 130 (see FIGURE 5) to be driven in the direction of arrows 148. The movement of arms 130 cause springs 135 to move towards an energized or extended position. When the rotational force exerted upon main shaft 12 is removed, springs 135, which desire to return to their de-energized position, urge arms 130 in the direction shown by arrows 149, causing cam 29a to be rotated counterclockwise or, in other words, in the direction opposite to that shown by arrow 147. Means (not shown) are provided in escutcheon stage 40 whereby cam 29a is restrained from moving beyond the arcuate edges 144 in order to prevent cam member 29a from dropping out of engagement with the cylindrical rollers 138, as will be more fully described.

The contact stage of the switch assembly which is shown in FIGURES 1, 6 and 7 through 10 consists of a molded case 30 which has a plurality of molded projections designed to accommodate the elements of the contact stage. An aperture 149 is provided in molded case 30 to accommodate the cam assembly 150 (see FIGURES 6 and 9) which consists of a cam hub 151, cam 152, cam retainer 153 and bearing 154. The circular ledge 155 of molded case 30 (see FIGURE 10) accommodates flange 156 on bearing 154 so as to prevent bearing 154 from exhibiting any movement other than rotational movement. Cam hub 151 (note especially FIGURES 12a and 12b) has a flanged portion 161 and a cylindrical body 166. The cylindrical body (note FIGURE 12a) has a plurality of grooves 162 around a portion of its periphery. The remainder of the periphery 163 contains no grooves. This unique configuration is designed to cooperate with the grooved 164 and ungrooved 165 portions of the aperture of cam 152 (see FIGURE 11) so that cam 152 may assume one, and only one, axial position with regard to cam hub 151. Bell-shaped cam retainer 153 has an aperture 168 which is formed by two circular punches 159 and 160 which overlap one another. The radius of circle 160 is greater than that of 159 for a reason to be more fully described.

The cylindrical portion 166 of cam hub 151 has a circular groove 167 surrounding the cylindrical portion. The innermost diameter of groove 167 is slightly less than the diameter of circle 159 in cam retainer 153, while the diameter 169 of cylindrical portion 166 is greater than the diameter of circle 159 in cam retainer 153. However, the diameter 169 is slightly less than the diameter of circle 160 in cam retainer 153. Cam retainer 153 is mounted to cam hub 151 as follows: The cylindrical portion 166 of cam hub 151 is inserted through portion 160 of aperture 168 in cam retainer 153 until the upper surface of cam retainer 153 abuts the lower surface of cam 152. Holding cam 151 stationary, cam retainer 153 is moved downward as shown by arrow 170 so that portion 159 of aperture 168 is brought into contact with groove 167 in cam hub 151. In this position, cam 152 and cam retainer 153 are rigidly secured to cam hub 151. Cam retainer 153 may be removed from cam hub 151 by simply holding cam hub 151 in the stationary position and moving cam retainer 153 upward as shown by arrow 171 in FIGURE 13, so that cylindrical portion 166 of cam hub 151 is positioned in circular portion 160 of aperture 168. In this position, cam hub 151 may be removed from cam retainer 153 simply by lifting cam hub 151 upward out of the plane of FIGURE 13.

The cam sub-assembly consisting of cam hub 151, cam 152 and cam retainer 153 is secured in molded case 30 as follows: After positioning bearing 154 in aperture 149, the cam sub-assembly (see FIGURE 7) is positioned in molded case 30 such that tongue 157 of cam retainer 153 is adjacent groove 172 in molded case 30 and tongue 158 of cam retainer 153 is adjacent groove 173 in molded case 30, as shown by dotted line 153'. The cam sub-assembly (as shown in FIGURE 9) is then rotated counterclockwise as shown by arrow 153a so that tongue 157 enters groove 172 and so that tongue 158 enters groove 173. The cam sub-assembly is now prevented from exhibiting any movement in the direction which is normal to the plane of FIGURE 7.

Each contact stage 60 (see FIGURE 6) consists of two contact sets 179 and 179a, each having a contact spring 178 and 178a, a movable contact 177 and 177a, stationary contacts 175–176, 175a–176a and a movable contact carrier 174 and 174a respectively. Each movable contact carrier 174 (see FIGURES 8a through 8c) has a guide tail 181 which is arranged to be slidably mounted in a groove 186 in molded case 30. A roller 180 is pivotally mounted in recess 183 of each movable contact carrier 174. Projections 182 which extend from one side of movable contact carrier 174 in the same direction as guide tail 181, are arranged to accommodate associated depressions 191 and 192 on movable contact member 177 (see FIGURE 7) for a purpose to be more fully described. Movable contact carrier 174 is positioned in recess 186 of molded case 30 so that roller 180 of movable contact carrier 174 engages the edge of cam 152, as shown by dotted line 174' in FIGURE 7.

The contact assembly 179 of FIGURE 6 is mounted in molded case 30 (see especially FIGURE 7) as follows: Stationary contact member 175 is inserted into molded case 30 so that portion 197 of stationary contact member 175 rests against projection 196 of molded case 30, portion 198 of stationary contact member 175 rests against projection 199 of molded case 30 and edge 200 of stationary contact member 175 rests against projection 201 of molded case 30. Stationary contact member 175 is slightly underformed so that edge 194 of stationary contact member 175 must be forced into groove 195 provided in molded case 30. This force fit of stationary contact member 175 permits contact member 175 to be self- retained within the molded case 30 without need for additional fastening means.

Stationary contacts 175, 175a, 176 and 176a are mounted to molded case 30 in a like manner. All four stationary contact members may be inserted or removed without the need for any additional fastening means, and without any need for a special tool or other implement.

Movable contact member 177 is then positioned in molded case 30 so that contact 189 of movable contact member 177 engages contact 187 of stationary contact member 176, and contact member 190 of movable contact member 177 engages contact 188 of stationary contact member 175. In this position, depressions 191 and 192 in movable contact member 177 come into engagement with the projections 182 on movable contact carrier 174, which projections aid in the contact rolling and wiping action as will be more fully described.

Contact spring 178 is arranged to have a tapered configuration. End 204 of contact spring 178 is positioned adjacent projection 193 on movable contact 177 (see FIGURE 10). Spring 178 is then compressed so that end 203 of contact spring 178 may be forced into engagement with the inner surface 206 of ledge 205 on molded case 30. Movable contact member 177a and contact spring 178a are positioned in molded case 30 in the same manner as movable contact 177 and contact spring 178.

Springs 178 and 178a of each contact assembly 179 and 179a urge the movable contact members 177 and 177a respectively towards engagement with the stationary contact members 175–176 and 175a–176a respectively. Cam 152 (see FIGURE 11), however, is designed to urge movable contact members 177 and 177a out of engagement with their stationary contact members. Cam 152 has an outer periphery which consists of circular portions 209 and cut-away portions 207 and 208 such that when circular portions 209 lie adjacent members 180 and 180a of movable contact carriers 174 and 174a respectively, movable contact members 177 and 177a are driven out of engagement with stationary contact members 176–175 and 176a–175a respectively. When cut-away portions such as the cut-away portions 207 and 208 of cam 152 lie adjacent to rollers 180 and 180a of movable contact carriers 174, contact springs 178 and 178a are then able to drive movable contacts 177 and 177a into engagement with stationary contacts 175–176 and 175a–176a respectively.

Transparent plastic strips 31a (see FIGURE 1) are positioned in rectangularly shaped slits 220 and 220', in molded case 30 (see FIGURE 7). Strips 31a permit the operator to closely observe the opening and closing operation of the contacts such as contacts 187 and 189 which are adjacent slit 220' without danger of being injured by an arc which is drawn between the contacts during either the opening or closing operation of the contacts.

Screw 211 engages the tapped aperture 222 in stationary contact member 176 (see FIGURE 7) to serve as the mounting for one terminal of the circuit to be controlled by the associated contact set. It should be understood that other stationary contact members are provided with a tapped aperture and associated screw in order to rigidly secure the associated circuit to be controlled to its respective contact set.

Cam 152 (see FIGURE 11) may have a variety of configurations (only one of which is shown) such that when contact set 179 is disengaged, contact set 179a is engaged, or such that when contact set 179 is engaged, contact set 179a is disengaged, and so forth. Likewise, cam 152 of each contact stage 60 may be different from the cam 152 of all other contact stages 60 of the switch assembly 10, enabling all the circuits under control of the switch assembly 10 to be energized or de-energized upon actuation of the auxiliary switch 10 in any manner which might be desired.

Figure 10:
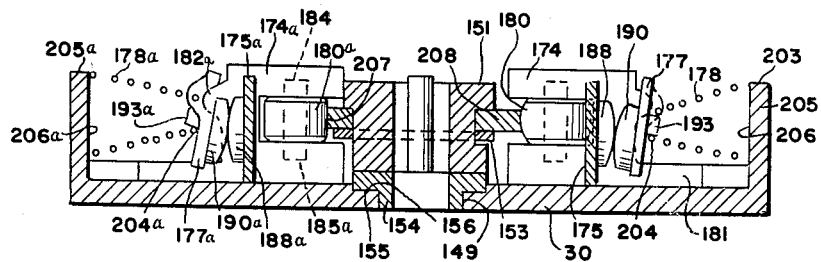
FIGURE 10 is a cross-sectional view of the contact stage shown in FIGURES 1, 6 and 7 taken along the line 10B—10B of FIGURE 1.

The wiping action of contact sets 179 and 179a is obtained as follows: The main shaft 12 (see FIGURE 1) rotates cam 152 of contact stage 60. The cut-away portions such as cut-away portions 207 and 208 come into engagement with rollers 180 and 180a (see FIGURE 10). The contact springs 178 and 178a cause the movable contact carriers 174 and 174a respectively to follow the cam contour. When the rollers 180 and 180a are adjacent the cut-away portions in the cam 152, contact springs 178 and 178a push the movable contact members 177 and 177a towards the stationary contact members 175–176 and 175a–176a respectively until the contacts 187–189, 188–190 and 187a–189a, 190a–188a are just touching. At this instant, the movable contact members 177 and 177a rotate about the molded projections 182 on movable contact carriers 174 and 174a respectively. The contact springs 178 and 178a continue to push on the movable contact members 177a and 177 until equilibrium is reached between the sliding contact friction and the contact spring force. FIGURE 10 shows movable contact member 177 at the right-hand side of FIGURE 10 at the instant that contacts 188 and 190 just touch, while movable contact member 177a on the left-hand side of FIGURE 10 shows the position of contacts 188a and 190a after the conclusion of the wiping action. Movable contact carriers 174 and 174a are formed of a non-conductive material which exhibits a low sliding coefficient of friction between movable carrier 174 and movable contact member 177 in order to obtain maximum rotation of movable contact members 177 and 177a. One material which has been shown to have a low sliding coefficient of friction is molded "Delrin."

The self-retention of all components in the contact stage 60 is retained throughout the operation of contact stage 60. For example, if the contact sets are disengaged, contact springs 178 and 178a buckle the movable contact carriers 174 and 174a upward between the spring retaining wall 205 and the cam edge 209 (see FIGURE 10). This buckling action, however, is prevented by the guide tails 181 of each movable contact carrier 174 and 174a, which abut against the coils of contact springs 178 and 178a which are retained by the retaining wall 206. The cam assembly shown in FIGURE 9 is prevented from being lifted out of molded case 30 by projections 157 and 158 on cam retainer 153, as described above.

The operation of flag indicator member 17a (see FIGURE 2) is as follows: The neutral position of operating handle 11 is as shown in FIGURE 2. In this position, the portion 100 of flag indicator member 17a which may be painted green, for example, appears beneath the window 85 in name-plate 18 (see FIGURE 3). When operating handle 11 is rotated clockwise in the direction shown by arrow 210, edge 122a of cut-away portion 122 of operating handle 11 abuts edge 107a of index finger 107, driving flag indicator member 17a clockwise in the same direction as arrow 210. Main shaft 12, which is fixedly positioned in rectangularly shaped hole 11a (see FIGURE 1) of operating handle 11, is also driven in a clockwise direction, thereby urging the contact sets of each contact stage 60 to be either engaged or disengaged, depending upon the cam configuration of each contact stage.

The rotation of flag indicator member 17a in the clockwise direction causes the portion 99 of flag indicator member 17a to be moved beneath window 85 in name-plate 18. Portion 99 of flag member 17a may be painted red, for example.

The detent mechanism 29 (see FIGURE 1) of detent stage 50 drives main shaft 12 and operating handle 11 back to the neutral position shown in FIGURE 2, upon release of the operating handle by the operator. During the return of operating handle 11 to the neutral position shown in FIGURE 2, edge 122b of cut-away portion 122 does not abut edge 107b of index finger 107. This permits spring 103 in molded case 17, which engages notch 101 of indicator flag member 17a, to retain indicator flag member 17a such that portion 99 of flag member 17a remains beneath window 85 in name-plate 18. This gives the operator a visual indication of the last movement of operating handle 11.

Operating handle 11 may also be rotated counterclockwise in the direction shown by arrow 211 so that edge 122b of cut-away portion 122 abuts edge 107b of index finger 107, driving flag indicator member 17a into counterclockwise rotation so flag indicator member 17a moves portion 100 of flag indicator member 17a beneath window 85 in name-plate 18.

Main shaft 12 and operating handle 11 are rotated back to the neutral position shown in FIGURE 2 by detent mechanism 29 in the same manner as described above. Edge 122a of cut-away portion 122 does not engage edge 107a of index finger 107 until operating handle 11 has returned to the neutral position so that flag indicator member 17a is retained in the position shown in FIGURE 2 by the engagement of spring 103 with the notch 102 of flag indicator 17a.

Molded index pin 109 which projects from molded case 17 is positioned to prevent rotation of flag indicator member 17a beyond a predetermined position by edges 212 and 213 of elongated notch 108a which abut molded index pin 109 at the extreme clockwise and counterclockwise rotations, respectively, of operating handle 11.

The overall operation of the switch assembly shown in FIGURE 1 is as follows: When operating handle 11 is rotated (either clockwise or counterclockwise) from the neutral position, main shaft 12 is likewise rotated, causing the cam 29a (see FIGURE 5) of the detent stage 50 and the cams 152 (see FIGURE 7) of each contact stage 60 to be rotated in the same direction as operating handle 11 and main shaft 12. Flag indicator member 17a is rotated under control of operating handle placing either portion 99 or portion 100 beneath the window 85 on name-plate 18 (see FIGURES 2 and 3).

At the instant the operator releases the manually operable handle 11, springs 135 of the detent mechanism 29 (see FIGURE 5) assumes control of main shaft 12, urging main shaft 12 to return to the neutral position, as shown in FIGURE 2. The rotation of main shaft 12 back to the neutral position returns the cams 152 of each contact stage 60 back to their respective neutral positions. Although the contact sets 179 and 179a of each contact stage are opened (or closed) for only a brief period, it should be understood that this make or break is of sufficient duration to actuate or to deactuate the circuit which each contact stage controls. The flag indicator member gives a visual indication of the last direction of rotation of operating handle 11.

The rotation of operating handle 11 is also limited by the positioning and securing means 15a which cooperates with mounting plate 16 as follows:

Retaining member 231 is pressure fitted within a groove (not shown) in main shaft 12 in order to longitudinally position bearing 232 which abuts retaining member 231 when the switch is completely assembled. Washer 232 fits into aperture 233 which serves to axially position shaft 12. Rotating member 234 having rectangular aperture 235 which engages shaft 12, is positioned adjacent mounting plate 16 and is secured in this position by friction fastener 238 which is also mounted upon shaft 12.

Rotating member has projections 236 and 237 which cooperate with apertures 239 and 240 to limit the number of degrees which main shaft 12 may be rotated by edge 236a of projection 236 which abuts edge 239a of aperture 239 to limit counterclockwise rotation and by edge 237a of projection 237 which abuts edge 240a of aperture 240 to limit further clockwise rotation.

If desired, the detent stage 50 of the switch assembly shown in FIGURE 1 may have its cam 29a replaced by star-shaped positioning wheels so that the main shaft 12 may remain in the position to which it has been rotated. In this particular assembly, the projection 11b on operating handle 11, in cooperation with the numbers on main plate 18, serves as the visual indicating means which apprises the operator of the condition of the contact sets at each stage 60.

The double break contact structure of each contact set 179 and 179a, by providing two breaks in the energized circuit with which it is associated, provides a more rapid extinguishment of any arcing which may occur between the contact curves 187-189 and 188-190 of each contact set 179, since the double-break provides a longer arc interrupting path for a shorter opening stroke compared to a single break contact with its attendant undesirable pigtails.

If it becomes necessary to remove any one of the contact stages 60 for either inspection or maintenance purposes, the contact stage to be inspected may be removed from the switch assembly simply by removing nuts 36 from bolts 21 and 22 and sliding the desired contact stage 60 away from the switch assembly 10, which does not effect the self-retaining feature of the elements of the contact stage. That is, the elements of the contact stage which have been removed from the switch assembly will not become disengaged from the molded case 28 of the contact stage 60 until the operator causes them to be removed. The removal and replacement of all elements in the contact stage is a simple operation, since the pressure fitting of all elements avoids the need for any form of fastening means. Molded case 30 shown in FIGURE 7 contains projections 223 and 224 which projections differ from one another. These projections, in cooperation with projections (not shown) on the rear surface of the adjacent contact stage permit the contact stage to be replaced in the switch assembly in only one axial position. This prevents the contact stage being replaced from being positioned upsidedown, for example. If the contact stage that has been removed is improperly replaced it will not rest flatly against the back surfaces of the adjacent contact stages thereby giving the operator a positive indication that the switch assembly has not been properly assembled.

In cases where it is desired to have an auxiliary switch assembly with a removable handle, it is necessary to prevent engagement of any handle but the correct one with the switch assembly. This is performed in the following manner:

Referring to FIGURE 2, it can be seen that flag indicator member 17a may be positioned within molded case 17 so that one of the notches 108 engages molded index pin 109. In this position, the flag member is prevented from experiencing any rotational movement. The operating handle 11 which cooperates with the switch assembly therefore, must have a groove which receives the index finger 107 and also a groove which receives the projection 14 on main shaft 12 (see FIG. 1).

By placing adapter plug 250 (see FIGURE 14) on the end of operating handle, the auxiliary switch assembly can be rotated by the handle.

Operating handle 11 has an adapter plug 250 screwed to the shank end 11a. This adapter has a slot 251 for receiving projection 14 of shaft 12 and a variable position slot 252 for receiving index finger 107. In addition, there is an annular groove 253 between the adapter 250 and the shank 11a of the handle. As the handle is pushed on the shaft 12, the adapter 250 cooperates with the projection 14 and the index finger 107 receiving projections 14 and index finger 107 by slots 251 and 252 respectively until the index finger 107 stops the handle when the groove 253 is reached, the index finger 107 abutting shank end 11a of operating handle 11. At this point, the handle is free to rotate since index finger 107 is positioned in the groove 253. This configuration also retains the handle on the shaft until the handle is returned to the initial position at which time it can then be removed from the shaft.

The adapter plug 250 may be designed with the groove 252 positioned in a variety of positions around the outer surface of the adapter plug in order to cooperate with the variety of rotational positions which the flag indicator member 17a is capable of assuming (due to the plurality of notches 108). This arrangement protects the system controlled by the auxiliary switch assembly from being operated by insertion of the incorrect operating handle into the switch assembly.

It can therefore be seen that I have provided a novel auxiliary switch assembly having a plurality of ganged contact stages which are simultaneously operable under the control of the single operating handle. All elements of each stage in the switch assembly have self-retaining features, avoiding the need for any form of fastening means, thereby resulting in a substantial decrease in the cost, complexity and fabrication time of the switch assembly. The working and wiping action of each contact set serves to minimize oxidation which may occur on the contact surfaces.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appended claims.

I claim:

1. An auxiliary switch assembly having at least one contact stage, said contact stage comprising a molded base having channels and recesses, stationary contact members, a cam and movable contact members said stationary contact members being side mounted in said channels of said base; said movable contact members and said cam being side mounted in said recesses of said base; said cam controlling the positioning and movement of said movable contact members in one plane, said contact members each having a bridging contact mounted at opposite ends thereof and positioned for engagement and disengagement with said stationary contact members, biasing means mounted between said movable contact members and said molded base to bias said movable contact members in the direction of said cam, movable carrier members positioned between said movable contact members and said cam having first and second projections extending therefrom abutting said movable contact members for imparting translational movement to said movable contact members in response to rotational movement of said cam, said movable carrier members further having a third projection extending beneath said movable contact members and beneath a portion of said biasing means to cooperate with said biasing means for preventing said movable contact members, said biasing means, and said movable carrier members from being disengaged from said molded base.

2. An auxiliary switch assembly having at least one contact stage, said contact stage comprising a molded base having channels and recesses, stationary contact members, a cam and movable contact members; said stationary contact members being side mounted in said channels of said base; said movable contact members and said cam being side mounted in said recesses of said base; said cam controlling the positioning and movement of said movable contact members in one plane, said contact members each having a bridging contact mounted at opposite ends thereof and positioned for engagement and disengagement with said stationary contact members, biasing means mounted between said movable contact members and said molded base to bias said movable contact members in the direction of said cam, movable carrier members positioned between said movable contact members and said cam having first and second projections extending therefrom abutting said movable contact members for imparting translational movement to said movable contact members in response to rotational movement of said cam, said movable carrier members further having a third projection extending beneath said movable contact members and beneath a portion of said biasing means to cooperate with said biasing means for preventing said movable contact members said biasing means and said movable carrier members from being disengaged from said molded base, cam retainer means slidably mounted in said recesses of said molded base for positioning and securing said cam in said molded base, said cam retainer means being movable by rotation thereof to permit removal of said cam.

3. An auxiliary switch assembly having at least one contact stage, said contact stage comprising a molded base having channels and recesses, stationary contact members, a cam and movable contact members; said stationary contact members being side mounted in said channels of said base; said movable contact members and said cam being side mounted in said recesses of said base; said cam controlling the positioning and movement of said movable contact members in one plane, said contact members each having a bridging contact mounted at opposite ends thereof and positioned for engagement and disengagement with said stationary contact members, biasing means mounted between said movable contact members and said molded base to bias said movable contact members in the direction of said cam, movable carrier members positioned between said movable contact members and said cam having first and second projections extending therefrom abutting said movable contact members for imparting translational movement to said movable contact members in response to rotational movement of said cam, said movable carrier member further having a third projection extending beneath said movable contact members and beneath a portion of said biasing means to cooperate with said biasing means for preventing said movable contact members, said biasing means and said movable carrier members from being disengaged from said base, said stationary contact members being slightly underformed to create a pressure fit between said stationary contact members and channels of said molded base, thereby avoiding the need for additional fastening means.

4. A ganged auxiliary switch assembly comprising a flag indicating stage and at least one contact stage, said contact stage including a molded case having channels and recesses, stationary contact members, movable contact members and a cam; said stationary contact members being side mounted in said channels of said case; said movable contact members and said cam being side mounted in said recesses of said case; said cam controlling the positioning and movement of said movable contact members in one plane, said movable contact members each having a bridging contact mounted at opposite ends thereof and positioned for engagement and disengagement with said stationary contact members, biasing means positioned between said molded case and said movable contact members to bias said movable contact members towards engagement with said stationary contact members, movable carrier means positioned between said movable contact members and said cam having first and second projections extending therefrom abutting said movable contact members for imparting translational movement to said movable contact members in response to rotational movement of said cam, said movable carrier means further having a third projection extending beneath said movable contact members and beneath a portion of said biasing means to cooperate with said biasing means to secure said biasing means, said movable contact members and said movable carrier means in said molded case, said flag indicating stage including means to provide a visual indication of the last positions to which said ganged auxiliary switch assembly was operated.

5. A ganged auxiliary switch assembly comprising a flag indicating stage and at least one contact stage, said contact stage including a molded case having channels and recesses, stationary contact members, movable contact members and a cam; said stationary contact members being side mounted in said channels of said case; said movable contact members and said cam being side mounted in said recesses of said case; said cam controlling the positioning and movement of said movable contact members in one plane, said movable contact members each having a bridging contact mounted at opposite ends thereof and positioned for engagement and disengagement with said stationary contact members, biasing means positioned between said molded case and said movable contact members to bias said movable contact members towards engagement with said stationary contact members movable carrier means positioned between said movable contact members and said cam having first and second projections extending therefrom abutting said movable contact members for imparting translational movement to said movable contact members in response to rotational movement of said cam, said movable carrier means further having a third projection extending beneath said movable contact members and beneath a portion of said biasing means to cooperate with said biasing means to secure said biasing means, said movable contact members and said movable carrier means in said molded case, said movable contact members having first and second recesses cooperating with the first and second projections of said movable carrier means for imparting a wiping action between said movable contact members and said stationary contact members when said members are moved towards engagement.

6. A ganged auxiliary switch assembly comprising a flag indicator stage and at least one contact stage, said flag indicator stage comprising a molded case having channels and recesses, a flag indicator member, a locking member and a front plate; said flag indicator member being side mounted in said recesses of said case, said locking member being slidably mounted in said channels of said molded case for securing said flag indicator member and said locking member to said molded case, said front plate being slidably mounted in said channels of said molded case for securing said front plate to said molded case, said front plate having a window for cooperating with said flag indicator member to indicate the condition of said switch assembly.

7. A ganged auxiliary switch assembly comprising a flag indicating stage, at least one contact stage, and driving means for simultaneously operating said flag indicating stage and said contact stage; said flag indicating stage including a molded case having channels and recesses, a flag indicating member, a locking member and a front plate member; said flag indicating member being positioned in said recesses of said molded case, said locking member being slidably mounted in said channels of said molded case for securing said locking member and said flag indicating member to said molded case, said front plate member being slidably mounted in said channels of said molded case for securing said front plate member to said molded case, said front plate member having a window cooperating with said flag indicating member for indicating the condition of said switch assembly, said flag indicating member having a projection which cooperates with said driving means to rotate said flag indicating member.

8. A ganged auxiliary switch assembly comprising a flag indicating stage, a detent stage and at least one contact stage; driving means for simultaneously operating said flag indicating stage, said detent stage and said contact stage; said detent stage including a molded case having channels and recesses and a detent mechanism; said detent mechanism comprising a rectangular sheet having a plurality of slots, a plurality of arms, one end of said arms being movably mounted in each of said slots, bias means mounted between the opposite ends of two of said arms for biasing said arms towards one another, cam means positioned between said driving means and said arms for driving said arms apart in response to movement of said driving means, said bias means being adapted to bias said arms towards one another upon termination of the movement of said driving means, the opposing forces of said cam means and said bias means cooperating to secure said arms, said cam means, and said bias means to said rectangular sheet without the necessity for additional fastening means, said flag indicating stage including means to provide a visual indication of the last positions to which said ganged auxiliary switch assembly was operated.

9. A ganged auxiliary switch assembly comprising a flag indicating stage, a detent stage and at least one contact stage; driving means for simultaneously operating said flag indicating stage, said detent stage and said contact stage; said detent stage including a molded base having channels and recesses and a detent mechanism; said detent mechanism comprising a rectangular sheet having a plurality of slots, a plurality of arms, one end of said arms being movably mounted in each of said slots, bias means mounted between the opposite ends of two of said arms for biasing said arms towards one another, cam means positioned between said driving means and said arms for driving said arms apart in response to movement of said driving means, said bias means being adapted to bias said arms towards one another upon termination of the movement of said driving means, the opposing forces of said cam means and said bias means cooperating to secure said arms, said cam means and said bias means to said rectangular sheet without the necessity for additional fastening means, said contact stage including a molded case having channels and recesses, stationary contact members, movable contact members and a cam; said stationary contact members being side mounted in said channels of said base; said movable contact members and said cam being side mounted in said recesses of said base; said cam controlling the positioning and movement of said movable contact members in one plant, said movable contact members each having a bridging contact mounted at opposite ends thereof and positioned for engagement and disengagement with said stationary contact members biasing means positioned between said molded base and said movable contact members to bias said movable contact members towards engagement with said stationary contact members, movable carrier means positioned between said movable contact members and said cam for imparting translational movement to said movable contact members in response to rotational movement of said cam, said movable carrier means having a projection which cooperates with said biasing means to secure said biasing means, said movable contact members and said movable carrier means in said molded base.

10. A ganged auxiliary switch assembly comprising a flag indicating stage having an index finger, at least one contact stage, and driving means for simultaneously operating said flag indicating stage and said contact stage; said driving means having a slot cooperating with said index finger to form a lost motion linkage, said flag indicating stage including a molded case having channels and recesses, a flag indicating member, a locking member and a front plate member; said flag indicating member being positioned in said recesses of said molded case, said locking member being slidably mounted in said channels of said molded case for securing said locking member and said flag indicating member to said molded case, said front plate member being slidably mounted in said channels of said molded case for securing said front plate member to said molded case, said front plate member having a window cooperating with said flag indicating member for indicating the condition of said switch assembly, said flag indicating member having a projection which cooperates with said driving means to rotate said flag indicating member.

11. A ganged auxiliary switch assembly comprising a flag indicating stage, at least one contact stage having an index finger, and driving means for simultaneously operating said flag indicating stage and said contact stage; said driving means having a slot cooperating with said index finger to form a lost motion linkage, said flag indicating stage including a molded case having channels and recesses, a flag indicating member, a locking member and a front plate member; said flag indicating member being positioned in said recesses of said molded case, said locking member being slidably mounted in said channels of said molded case for securing said locking member and said flag indicating member to said molded case, said front plate member being slidably mounted in said channels of said molded case for securing said front plate member to said molded case, said front plate member having a window cooperating with said flag indicating member for indicating the condition of said switch assembly, said flag indicating member having a projection which cooperates with said driving means to rotate said flag indicating member, the molded case of said flag indicating stage having a projection, said flag indicating member having an elongated notch cooperating with said projection to limit the sweep of said driving means.

12. A ganged auxiliary switch assembly comprising a flag indicator stage and at least one contact stage, said flag indicator stage comprising a molded case having channels and recesses, a flag indicator member, a locking member and a front plate; said flag indicator member being side mounted in said recesses of said case, said locking member being slidably mounted in said channels of said molded case for securing said flag indicator member and said locking member to said molded case, said front plate being slidably mounted in said channels of said molded case for securing said front plate to said molded case, said front plate having a window for cooperating with said flag indicator member to indicate the condition of said switch assembly, said flag indicating member having an index finger; and operating handle, adapter means mounted to said operating handle for having a longitudinal groove and annular groove for receiving said index finger, said longitudinal groove being adapted to permit said operating handle to be inserted into said switch assembly and said annular groove being adapted to permit said auxiliary switch assembly to be operated by said operating handle.

References Cited by the Examiner

UNITED STATES PATENTS

| 790,262 | 5/05 | Perkins | 200—167 |
| 2,336,389 | 12/43 | Bentley | 200—16 |
| 2,535,161 | 12/50 | Robbins | 200—16 |
| 2,579,169 | 12/51 | Barry | 200—166 |

BERNARD A. GILHEANY, *Primary Examiner.*